(12) United States Patent
Danielson et al.

(10) Patent No.: US 6,755,361 B2
(45) Date of Patent: Jun. 29, 2004

(54) HIGH PRESSURE ADJUSTABLE SPRAY NOZZLE APPARATUS

(75) Inventors: Peter C. Danielson, Lethbridge (CA); Jim A. Stewart, Lethbridge (CA)

(73) Assignee: The Green Six Ltd., Calgary (CA)

( * ) Notice: Subject to any disclaimer, the term of this patent is extended or adjusted under 35 U.S.C. 154(b) by 116 days.

(21) Appl. No.: 10/131,386

(22) Filed: Apr. 25, 2002

(65) Prior Publication Data

US 2003/0201347 A1 Oct. 30, 2003

(51) Int. Cl.[7] .............................................. B05B 15/08
(52) U.S. Cl. .............................. 239/587.1; 239/587.2; 239/587.5; 239/587.6; 239/588
(58) Field of Search .......................... 239/587.1, 587.2, 239/587.5, 587.6, 588

(56) References Cited

U.S. PATENT DOCUMENTS

| | | | | |
|---|---|---|---|---|
| 555,147 A | * | 2/1896 | Burck ......................... | 239/588 |
| 642,188 A | * | 1/1900 | Weston et al. .............. | 239/588 |
| 1,016,281 A | * | 2/1912 | Lundquist .................... | 239/588 |
| 1,219,049 A | * | 3/1917 | Sticklin ....................... | 239/588 |
| 1,752,193 A | * | 3/1930 | O'Hanlon ................... | 239/588 |
| 2,218,759 A | * | 10/1940 | Lineman ..................... | 239/588 |
| 5,707,014 A | | 1/1998 | Chan et al. | |
| 6,045,064 A | | 4/2000 | Abraham | |
| 6,079,640 A | | 6/2000 | Merritts | |
| 6,131,831 A | | 10/2000 | Lawrence | |
| 6,267,308 B1 | | 7/2001 | Hall | |

* cited by examiner

Primary Examiner—Robin O. Evans
(74) Attorney, Agent, or Firm—Sean W. Goodwin

(57) ABSTRACT

An adjustable spray apparatus and method for attachment to a high pressure liquid source, such as a car wash wand, comprising a flexible hose, the spray end of which is directionally adjustable by flexing and straightening the hose through the use of a tensile connector attached at the end thereof. Preferably the hose is mounted inside a housing to assist in attaching it to a high pressure source and a sleeve slidable about the housing aids in adjusting the tensile connector.

11 Claims, 6 Drawing Sheets

HIGH PRESSURE ADJUSTABLE SPRAY NOZZLE APPARATUS

FIELD OF THE INVENTION

The present invention relates generally to spray cleaning devices. More particularly the invention related to an adjustable spray nozzle apparatus adapted to a wand for conveniently spraying all surface of a vehicle including its underside.

BACKGROUND OF THE INVENTION

There are many devices which utilize water or other liquids to clean or rinse an object, including the well known water wand which dispenses water under high pressure to spray deposits such as dirt and salt from vehicles. The high pressure aids in removing the deposits that would not ordinarily be removed by the pressure provided by domestic water supplies.

Previously, the removal of deposits from areas such as the underside of a vehicle, or any other object, posed difficulties. It is awkward to thoroughly clean the underside of vehicle with a garden hose or conventional water wand due to the fact that the angle of the spray is not easily changed except by substituting a custom wand. If one attempts to use a conventional wand, it is difficult to effect an upward spray orientation except to crouch down to the wet ground. Others have attempted to address this problem. A number of devices have been developed for directing a spray of liquid underneath the underbody of a vehicle while allowing the user of the device to remain standing upright.

For example, U.S. Pat. No. 6,079,640 to Merritts describes a water spraying device for cleaning the underside of an automobile. Although this device allows a user to stand upright while directing a spray of water under the automobile a user is required to change to a different device or conventional wand to clean the remaining upper and side portions of the vehicle.

Application of a multiplicity of wands have disadvantages including: increased capital and maintenance costs, inconvenience to the user, danger in switching pressurized components and eventual loss of components.

In U.S. Pat. No. 5,707,014 to Chan et al., an apparatus is disclosed which allows the operator to adjust the spray angle of a spray cleaning device. Chan teaches a water cleaning apparatus wherein a plurality of jets are angularly adjustable such that the device may be directed upwardly to clean the underside of a vehicle or laterally to clean the surface itself (e.g. a driveway). However, the spray device described by Chan is heavy and is mounted on a frame having supporting wheels and thus is not readily manipulated by hand nor is it convenient to clean the remainder of the vehicle.

Ideally, a device designed to conveniently clean a vehicle, including the side, the underside and even various other areas including the engine, would enable the spray device to be hand manipulated with some flexibility in selecting the direction of the spray nozzle.

SUMMARY OF THE INVENTION

In one preferred embodiment, the adjustable spray apparatus comprises a tubular housing, a flexible hose having a source end mounted to the housing and a nozzle end, a sleeve fitted over top of the housing and moveable relative thereto, and a tensile connector extending between the hose's nozzle and the moveable sleeve. The hose has a normally linear straight position and is capable of bending to a plurality of flexed positions. The housing is adapted for connecting to the wand of a conventional spray washer so as to direct the high pressure liquid source from the wand into the hose. A spray nozzle is fitted to the nozzle end of the hose. Movement of the sleeve results in a flexing of the hose.

When the sleeve is moved back by manual manipulation the tensile connector exerts a pulling force on the nozzle end and the hose is bent into a flexed position. The resistive resilience of the hose causes it to return to the normally linear straight position when released. Preferably, the sleeve has a plurality of helical slots which co-operate with a bolt in the housing so as to incrementally lock the sleeve, and thereby the hose, into a number of predetermined positions.

Therefore in a broad apparatus aspect of the invention, the adjustable spray nozzle comprises a flexible hose adapted at one end to connect to a high pressure source of liquid and at the other end to a spray nozzle. The flexible hose has a normally straight position and is capable of bending to a plurality of flexed positions. A tensile connector, having a length sufficient to extend from one end of the hose to the other, is attached at the nozzle end of the hose. The tensile connector is adjustable so as to alternately draw the nozzle end towards or away from the source end and thereby changing the angle of the spray exiting the spray nozzle relative to the high pressure source.

The described apparatus enables the implementation of novel methods for the spray cleaning of an object while selecting the direction of the spray nozzle comprising: providing a flexible hose having a source end adapted for connection to a source of pressurized liquid and having a nozzle end adapted for connection to a spray nozzle for dispensing the pressurized liquid and providing a tensile connector connected to the nozzle end; adjusting the tensile connector so as to alternately draw the nozzle end towards or away from the source end for flexing the hose to at least one of the one or more flexed positions or the normally straight position.

DETAILED DESCRIPTION OF THE PREFERRED EMBODIMENTS

Figures 1, 2A, 2B, 2C:
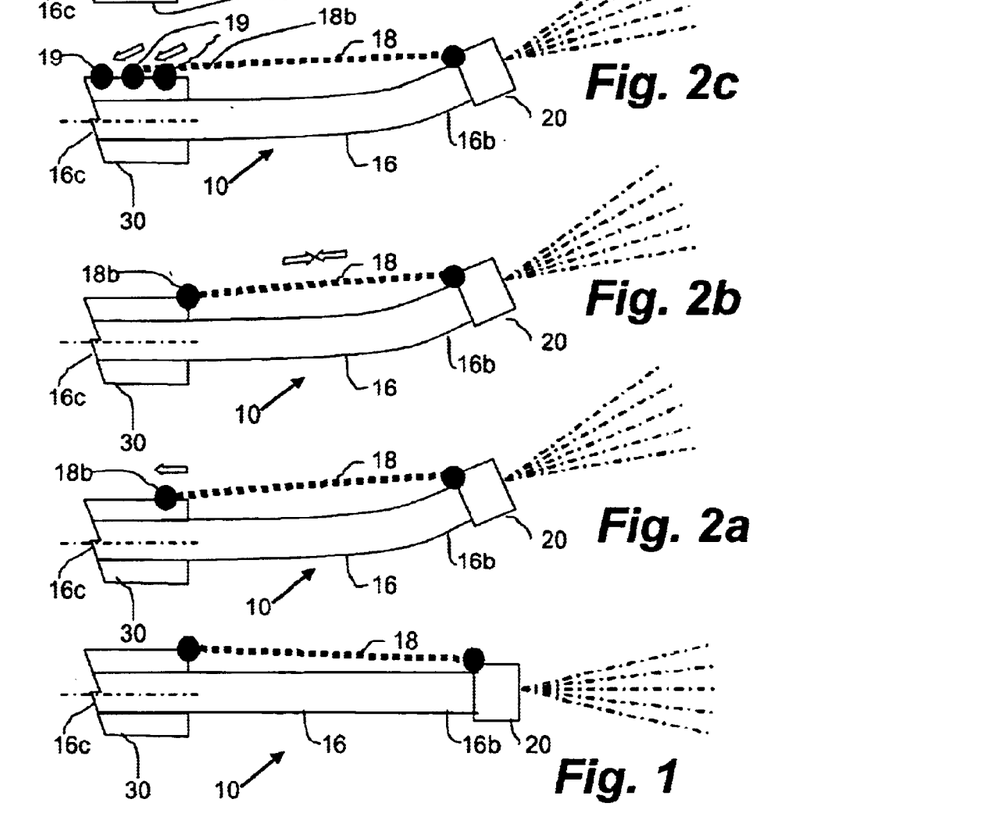
FIG. 1 is a schematic side view of one embodiment of the invention with the tensile connector released and the hose in a straight position.
FIG. 2a is a schematic side view of an alternate embodiment of FIG. 1a with the wand end of the tensile connector manipulated away from the hose's nozzle flexing the hose.
FIG. 2b is a schematic side view of an alternate embodiment of FIG. 1a with the tensile connector shortened flexing the hose.
FIG. 2c is a schematic side view of yet another embodiment of the invention with the wand end of the tensile connector connected at any of a number of alternate and multiple points of attachments thereby flexing the hose.
Figure 3:
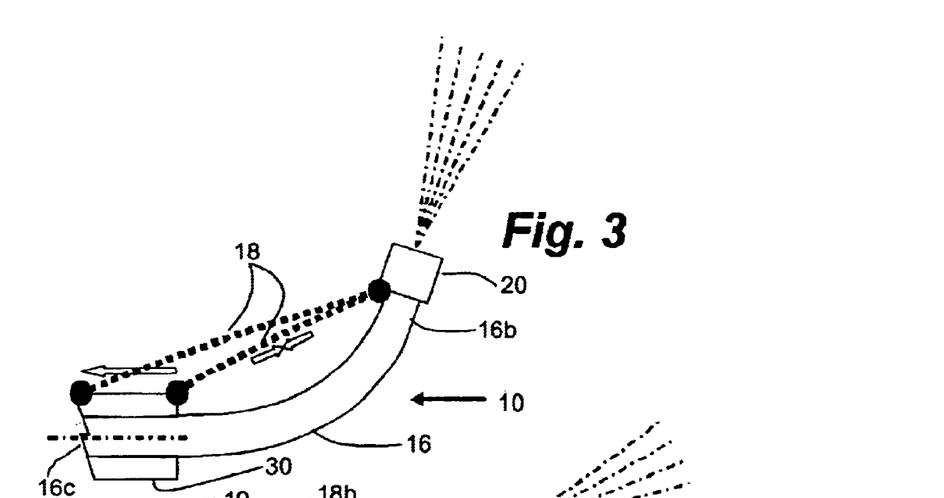
FIG. 3 is a schematic side view of both of the alternate embodiments of FIGS. 2a and 2b showing the flexing of the hose.

Having reference to FIGS. 1–3, in a simple embodiment, an adjustable spray apparatus 10 comprises a flexible hose 16 having a source end 16c connected to a wand 30 or other source of pressurized fluid—like hot water, solvent or steam. At an opposing nozzle end 16b of the hose 16 is a spray nozzle 20 for dispensing the pressurized fluid according to the nozzle 20 design. The nozzle end 16b is connected to or linked to the wand 30 or some other structure adjacent the source end 16c of the hose 16 using a tensile connector 18. Through adjusting means, the tensile connector 18 alternately pulled or released which respectively draws the nozzle end 16b towards the source end 16c or permits the nozzle end 16b to recede. As a result of the adjusting means and the tensile connector 18, the flexible hose 16 is operable between a linearly extending, substantially straight position to one of a substantially infinite number of flexed positions. When flexed, the nozzle 20 is redirected from straight ahead to a variety of angled positions.

More particularly, in FIG. 1a, the tensile connector 18 is released and the hose 16 is in the straight position. In FIGS. 2a–2c, alternate adjusting means are illustrated. In FIG. 2a, the tensile connector 18 is invariant in length and a wand end 18b of the tensile connector 18 is manipulated away from the hose's nozzle end 16b so as to flex the hose 16 and angle the nozzle end 16b. In FIG. 2b, the tensile connector 18 itself is shortened, such as through a turnbuckle or other connector tensioning means. In FIG. 2c, the tensile connector 18 is invariant in length and the wand end 18b of the tensile connector 18 is connected at any of a number of alternate and multiple points of attachments 19 so as to flex the hose 16 and angle the nozzle end 16b. The multiple connector attachments 19 are spaced apart and are progressively further away from the nozzle end 16b of the hose 16. Preferably the adjusting means include a housing (not shown) onto which the multiple connector attachments 19 are mounted.

With reference to FIG. 3, both of the alternate embodiments of FIGS. 2a and 2b are shown to result in the same effect, the hose 16 being flexed and the nozzle end 16b being manipulated to an angled position. In all cases, lengthening of the effective length of the tensile connector 18 (FIGS. 2a,3), or advancing of the wand end 18b of the tensile connector 18 (FIGS. 2b, 3) releases or returns the hose 16 to the straightened position.

Figure 4:
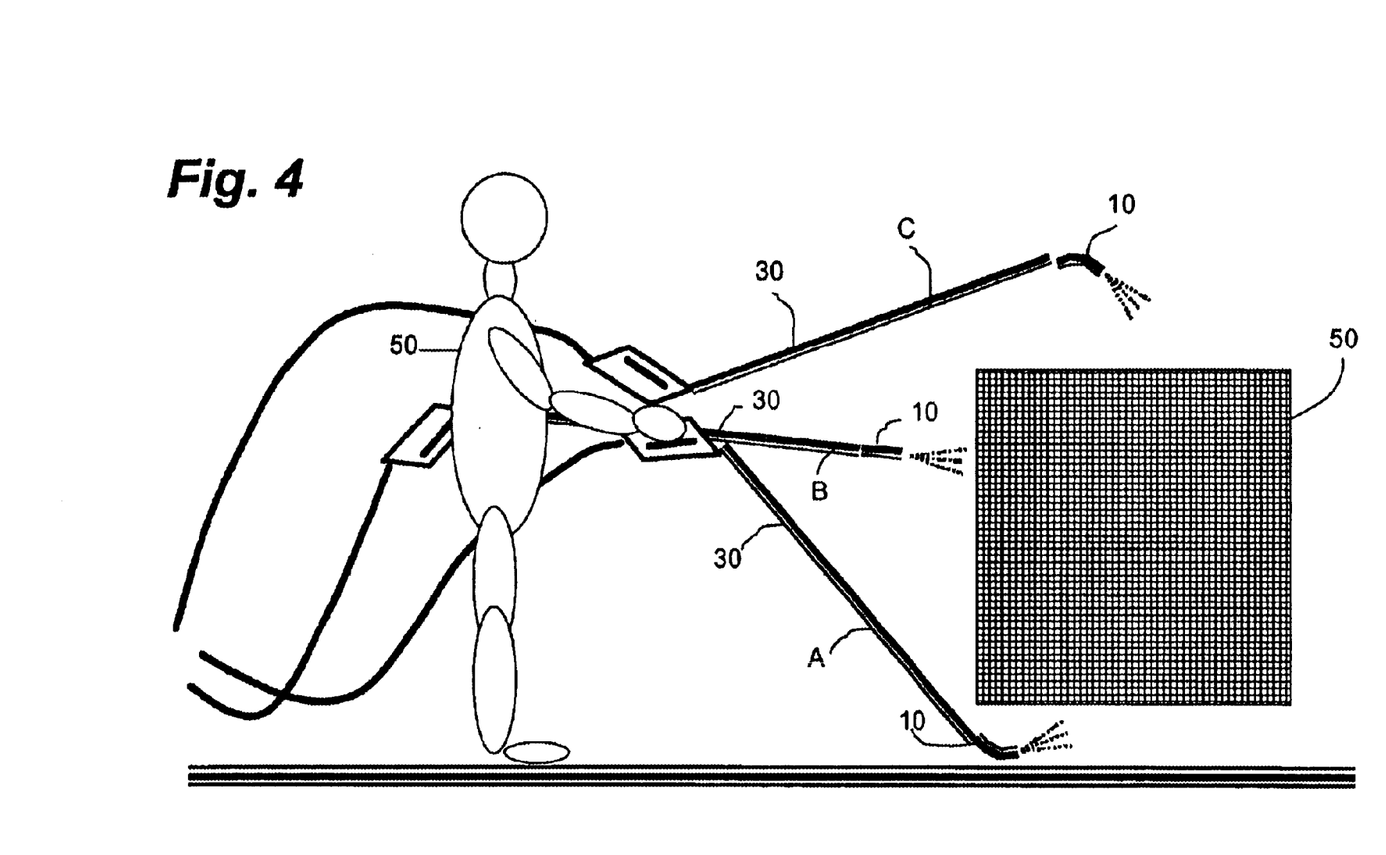
FIG. 4 is a schematic side view of a person using one embodiment of the spray apparatus in a variety of orientations.

In FIG. 4, a person 50 is illustrated being able to use the novel spray apparatus 10 in a variety of orientations. The adjustable spray apparatus 10 is adapted to connect to the wand 30 of a conventional spray washer 31, replacing the usually nozzle. A source of pressurized fluid is routed through the wand 30 to the spray apparatus 10. Three orientations of the wand are shown A,B and C, although the person 50 is only shown actually using the spray apparatus 10 adjusted to a flexed position and oriented A to spray the underside of an object 50. The wand 30 and spray apparatus 10 can also be adjusted to a straight position and oriented B to spray the side of an object 50, or adjusted again to a flexed position and oriented C to spray the topside of an object. For simplicity in illustrating orientation C, the wand 30 is shown as being rotated, however, the wand 30 could also be fitted with a swivel (not shown) so than the wand 30 need not be rotated to orient the spray apparatus 10 downwardly. Note that the person 50 using the adjustable spray apparatus 10 can remain standing upright for any of the possible orientations.

Figure 5A:
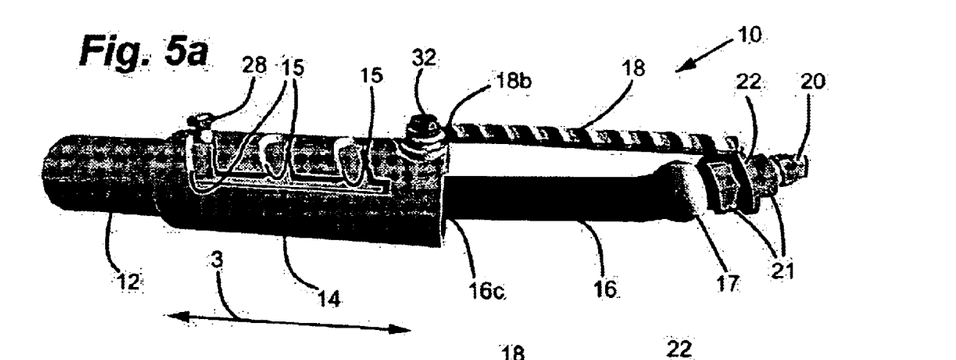
FIGS. 5a–5c are perspective side views of another embodiment of the spray apparatus.
Figure 5B:
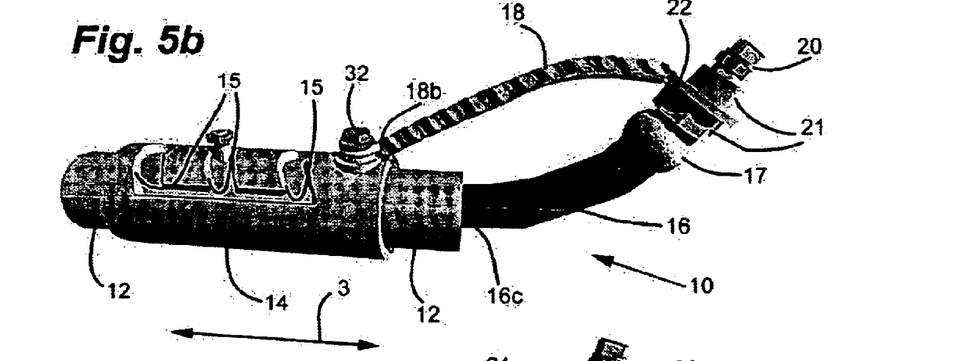
Figure 5C:
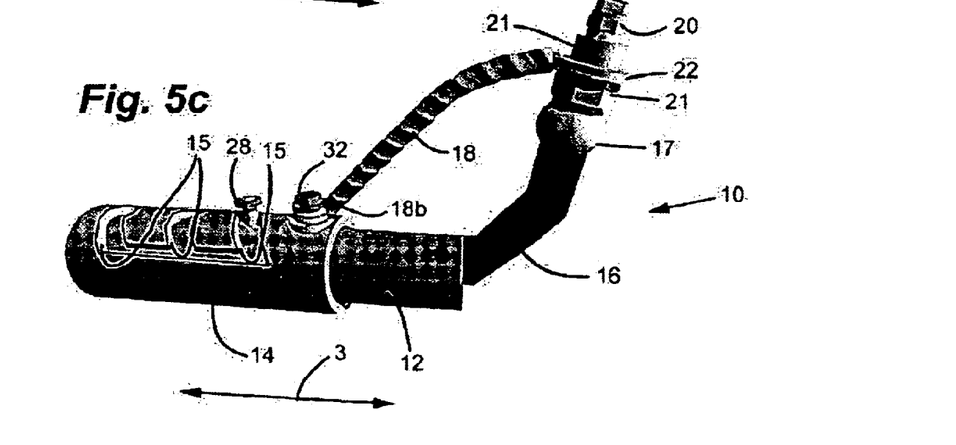

Turning to FIGS. 5a–5c, in another embodiment, the adjustable spray apparatus 10 is shown comprising a tubular mandrel or housing 12 adapted for connection to the source such as a wand, an adjusting means in the form of a moveable connector attachment such as a sleeve 14, a flexible hose 16 having a nozzle end 16b and a source end 16c, and a tensile connector 18. In this embodiment, the wand end 18b of the tensile connector 18 is connected to and is movable with the connector sleeve 14 for flexing the hose 16.

Both the housing 12 and the connector sleeve 14 are rigid tubular members. The sleeve 14 is fit concentrically and slidably over the housing 12. The diameters of both tubes 12, 14 are complementary so as to allow the sleeve 14 to move relative to the housing 12 by sliding over it along the longitudinal axis 3 of the housing 12.

Figure 6:
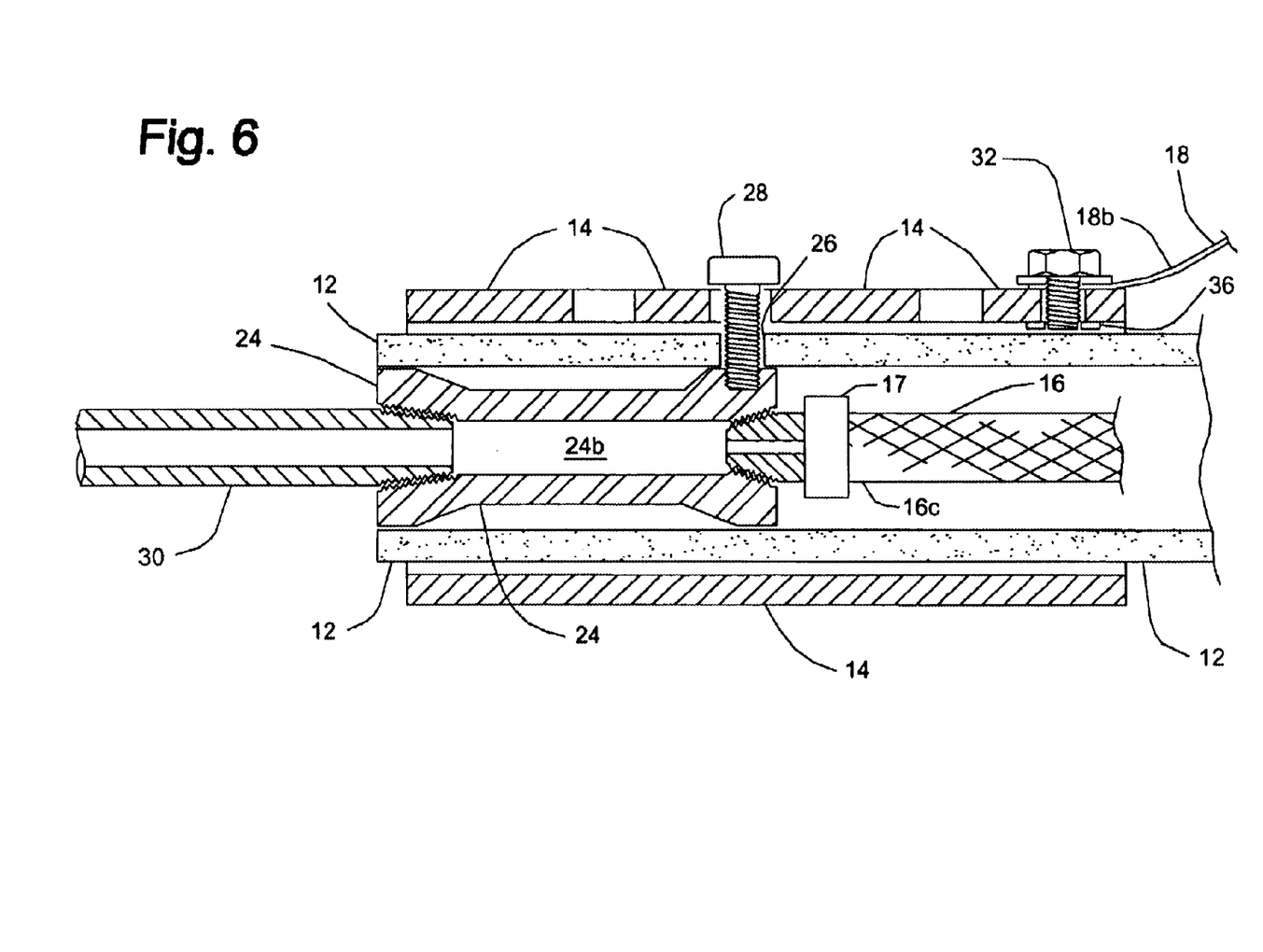
FIG. 6 is a sagittal section of the embodiment shown in FIGS. 5a–5c illustrating the attachment of the flexible hose to the housing and to a high pressure source of liquid.

Turning to FIG. 6, the hose 16 is connected to the wand 30 at a female-to-female tubular coupler 24 formed part of or mounted within the housing 12. Fitting 17 at the source end 16c the flexible hose 16 is connected to the coupler 24, the coupler 24 having a bore 24b for conducting pressurized fluid to the hose 16. The coupler 24 slides snuggly inside the housing 12. Preferably the source of high pressure liquid is a car-wash wand 30, but other sources can be utilized using appropriate couplers 24. The coupler 24 is secured inside the housing 12 by fastening means such as a bolt 28 which extends through a hole 26 in the housing 12 and which threads into the side of the coupler 24 so as to restrain and stabilize it against the inside of the housing 12. The wand end 18b of the tensile connector 18 is secured to the sleeve 14 with a suitable fastener. Preferably the fastener is a bolt 32 secured to the sleeve 14 with a nut 36. The bolt 32 acts as an anchor for the tensile connector 18. Preferably the nut 36 has a slim profile, or is counter sunk into the sleeve 14, so as not to interfere with the sliding of the sleeve 14 relative to the housing 12.

Referring again to FIGS. 5a–5c, the adjusting means further comprises two or more adjusting helical slots 15 formed in the sleeve 14 for enabling adjustment of the tensile connector 18 between the straight position and one or more flexed positions. The bolt 28 for the coupler (not shown) conveniently cooperates with the slots 15 to restrain the sleeve 14. Further aiding in the action of the adjusting means, the hose 16 has a resistive resilience which normally return the hose 16 to the straight position if released. Accordingly, the helical slots 15 are angled so that the resilience of the hose 16 causes the bolt 28 and slot 15 into more secure engagement and secure positioning. The slots 15 permit the sleeve 14 and tensile connector 18 to be locked in a number of predetermined positions along the longitudinal plane 3 of the housing 12. A suitable tensile connector 18 is a cable (FIGS. 5a–5c). Another suitable connector 18 for implementation in an adjusting means having a movable wand end 18b is a linkage with pivoting ends at the nozzle end and the adjusting means.

The length of the connector 18 and the positioning of the slots 15 in the sleeve 14 cooperate to enable at least a substantially straight orientation and one or more flexed positions.

Accordingly with reference to FIG. 5a when the sleeve 14 is moved towards the flexible hose 16, the connector 18, the sleeve 14 and the slots 15 cooperate to allow the hose 16 to assume a linearly extending, straight position parallel to the longitudinal plane 3 of the housing 12.

In FIGS. 5b and 5c, as the sleeve 14 is moved further and further away from the flexible hose 16, more and more tension is applied through the connector 18 to the nozzle end 16b to flex the hose 16 to an intermediate flexed position (FIG. 5b) and to an extreme flexed position which is substantially perpendicular to the housing's axis 3. The hose 16 slightly resists flexing and to restrain the hose 16 at the selected position, an appropriate helical slot 15 is coupled with the bolt 28 by a slight rotation of the sleeve 14. As the hose 16 flexes more and more, the nozzle end 16b assumes a greater and greater angle relative to the longitudinal axis 3 of the housing 12.

Figure 7A:
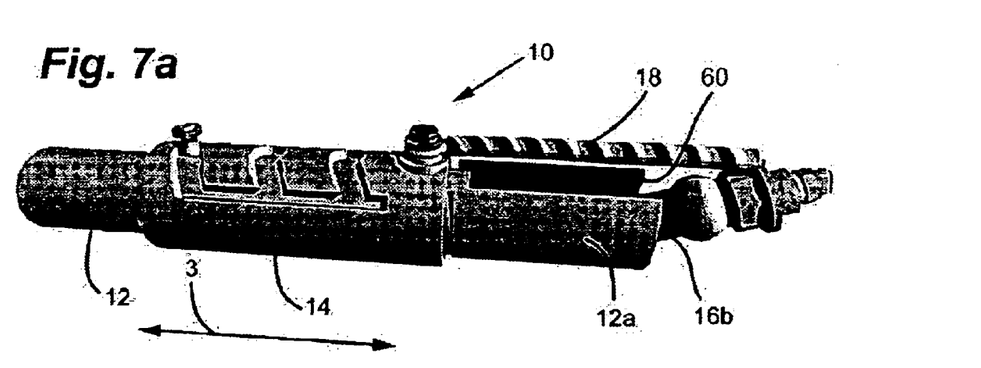
FIGS. 7a–7c are perspective side views of another embodiment of the spray apparatus.
Figure 7B:
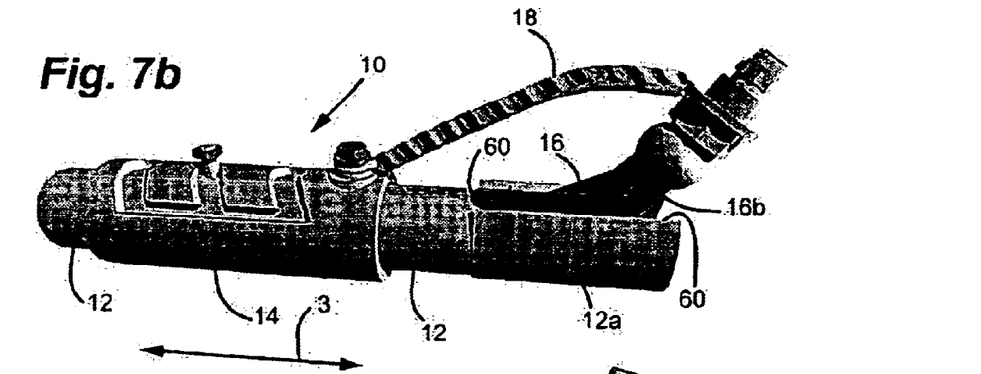
Figure 7C:
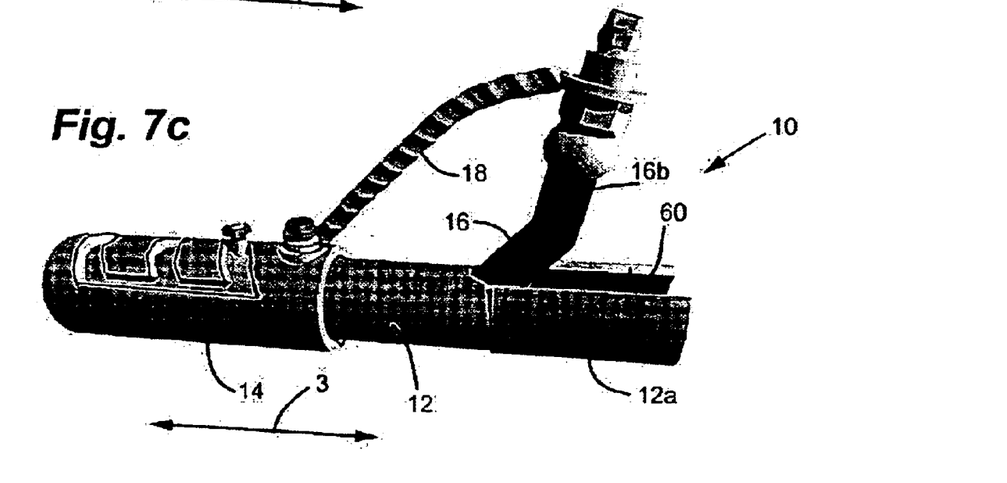
Figure 8:
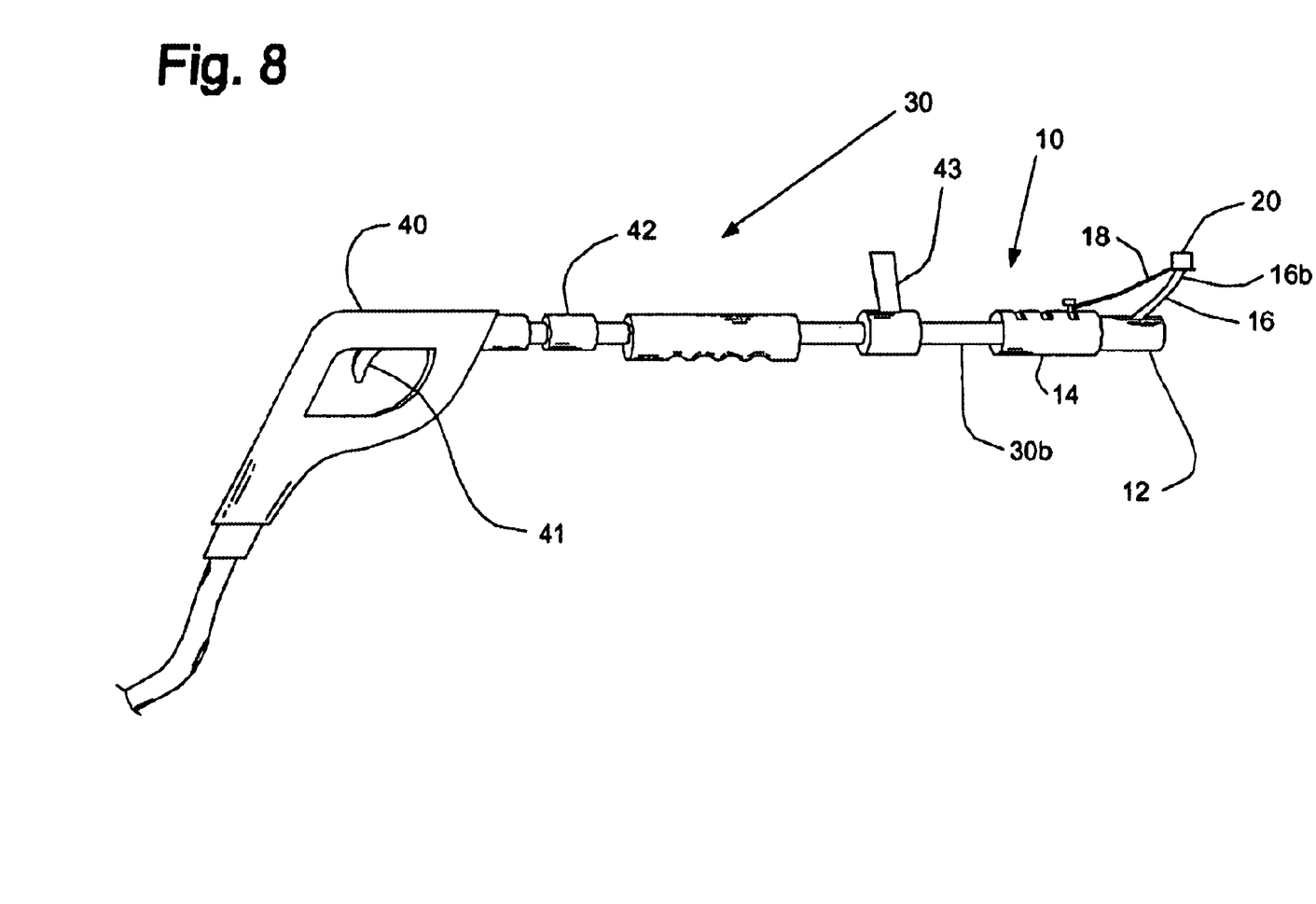
FIG. 8 is a schematic side view of one embodiment of the spray apparatus connected to car-wash wand as the source of high pressure liquid.

FIGS. 7a–7c illustrate another embodiment of the adjustable spray apparatus 10. Like the embodiment described above and in FIGS. 5a–5c, the spray apparatus 10 comprises a housing 12, a moveable connector sleeve 14, a flexible hose 16 and a tensile connector 18. The housing 12 of this embodiment extend longitudinally to encompass the hose 16 when in the straight position. This extension of the spray end 12a of the housing 12 aids in protecting the hose 16 and can also serve as an additional hand hold for a user during the operation of the spray apparatus 10. A longitudinal groove 60 is formed in the spray end 12a of the housing 12 and which is sufficiently large to allow the hose 16 to flex out of, and as much as perpendicular to, the housing 12 when the connector sleeve 14 is moved away from the spray end 12a of the housing 12 and tension is applied through the connector 18 to the nozzle end 16b of the hose 16.

With reference to FIGS. 5a–5c, 6 and 8, the spray apparatus 10 is adapted for connection to a source of high pressure liquid such as a car-wash wand 30. The apparatus 10 is threaded onto the end 30b of the wand 30. The wand 30 comprises a handle 40 and flow control trigger 41. Between the handle and the spray apparatus 10 is a swivel 42 and a grip 43 which can be used by a person to control rotation of the spray nozzle about the swivel 42 . For adaptation to conventional wands found in do-it yourself vehicle washing bays, one form of the spray apparatus 10 described above could have the following characteristics. Emphasizing a lightweight construction, a suitable housing 12 can be constructed using an 11" long piece of PVC pipe with an inside diameter of 1-1/16" and an outside diameter of 1-3/8". Likewise, a suitable connector sleeve 14 can be constructed using a 5" long piece of PVC pipe with an inside diameter of 1-3/8" and an outside diameter of 1-5/8". The flexible hose 16 can be a 9" long, 1/2" inside diameter, steel braided high pressure rubber hose 16 having steel coupler fittings 17 crimped on at the source end 16c and the nozzle end 16b. The fittings 17 have a 1/2" threaded male end to enable threaded coupling of the hose 16 to the housing 12 and to the nozzle 20. Both the hose 16 and fittings 17 are known and can be sourced through Princess Auto Ltd., Winnipeg, Manitoba. A female-to-female coupling fitting 21 is threaded onto the hose's nozzle end 16b, and a spray nozzle 20, with a 12" diameter male end, is likewise threaded into the fitting 21. Preferably, the outer diameter of the coupling 24, which resides within the housing 12, is machined to remove unneeded and heavy material from its midsection. At the hose's nozzle end 16b, a point of connection or flange such as a washer 22 is sandwiched between the fitting's enlarged end 21b and an external snap ring (not shown). The washer 22 facilitates attachment of the connector 18 to the nozzle end 16b.

The embodiments of the invention in which an exclusive property or privilege is being claimed are defined as follows:

1. Adjustable spray apparatus comprising:
   a flexible hose having a source end adapted for connection to a source of pressurized liquid and having a nozzle end adapted for connection to a spray nozzle for dispensing the pressurized liquid, the hose having a normally substantially linearly extending straight position and one or more angled, flexed positions;
   a housing, to which the source end of the hose is mounted,
   a sleeve, moveable axially relative to the housing,
   a tensile connector attached between the nozzle end of the hose and the sleeve when the hose is in its straight position wherein when the sleeve is moved axially relative to the housing the hose is caused to alternately flex or straighten; and
   locking means acting between the sleeve and the housing for locking the angle of the hose in at least one of the one or more flexed positions.

2. The adjustable spray apparatus of claim 1 wherein the housing extends substantially to the nozzle end of the hose, and further comprises:
   a longitudinal groove for housing the hose when it is in its straightened position and to allow the nozzle end to flex in and out of the housing as the angle is adjusted.

3. The adjustable spray apparatus of claim 1 wherein the locking means further comprises:
   a bolt and a plurality of co-operating helical slots acting between the housing and the sleeve wherein rotation of the sleeve engages the bolt in one of the plurality of helical slots to prevent further axial movement of the sleeve on the housing.

4. The adjustable spray apparatus of claim 3 wherein the hose further comprises a resistive resilience and the helical slots are angled sufficient that the resistive resilience causes the bolt to more fully engage the helical slots.

5. The adjustable spray apparatus of claim 3 wherein the helical slots are formed on the sleeve and the bolt extends outwards from the housing.

6. An adjustable spray apparatus comprising:
   a flexible hose having a source end adapted for connection to a source of pressurized liquid and having a nozzle end adapted for connection to a spray nozzle for dispensing the pressurized liquid, the hose having a normally substantially linearly extending straight position or more flexed positions;
   a tensile connector attached to the nozzle end of the hose and extend from the nozzle end to a position adjacent the source end when the hose is in its straight position; and
   a housing, to which the source end of the hose is mounted, the housing having multiple points of attachments spaced apart therealong and so that by attaching the tensile connector to any one of the multiple points of attachment, the hose is caused to flex or straighten thereby adjusting an angle of the nozzle end of the hose relative to the housing.

7. Adjustable spray apparatus comprising:
   a flexible hose having a source end adapted for connection to a source of pressurized liquid and having a nozzle end adapted for connection to a spray nozzle for dispensing the pressurized liquid, the hose having a normally substantially linearly extending straight position and one or more angled, flexed positions;
   a housing, to which the source end of the hose is mounted, wherein the housing extends substantially to the nozzle end of the hose, and further comprises a longitudinal groove for housing the hose when it is in its straightened position and to allow the nozzle end to flex in and out of the housing as the angle is adjusted;
   a sleeve, moveable axially relative to the housing; and
   a tensile connector attached between the nozzle end of the hose and the sleeve when the hose is in its straight position wherein when the sleeve is moved axially relative to the housing the hose is caused to alternately flex or straighten.

8. The adjustable spray apparatus of claim 7 further comprising locking means acting between the sleeve and the housing for locking the angle of the hose in at least one of the one or more flexed positions.

9. The adjustable spray apparatus of claim 7 wherein the locking means further comprises:

a bolt and a plurality of co-operating helical slots acting between the housing and the sleeve wherein rotation of the sleeve engages the bolt in one of the plurality of helical slots to prevent further axial movement of the sleeve on the housing.

10. The adjustable spray apparatus of claim 9 wherein the hose further comprises a resistive resilience and the helical slots are ended sufficient that the resistive resilience causes the bolt to more fully engage the helical slots.

11. The adjustable spray apparatus of claim 9 wherein the helical slots are formed on the sleeve and the bolt extends outwards from the housing.

* * * * *